United States Patent Office 3,824,302
Patented July 16, 1974

3,824,302
METHOD OF GROWING MONOCRYSTALS OF RUBY FROM A MOLTEN CHARGE
Vladimir Ilich Alexandrov, ulitsa Krupskoi 4, korpus 3, kv. 48; Vyacheslav Vasilievich Osiko, ulitsa Vavilova 48, kv. 63; and Vladimir Mikhailovich Tatarintsev, Leninsky Prospekt 45, kv. 112, all of Moscow, U.S.S.R.
Filed Jan. 28, 1971, Ser. No. 109,366
Int. Cl. B01j *17/18;* C04b *35/10;* H05b *5/00*
U.S. Cl. 423—625    3 Claims

ABSTRACT OF THE DISCLOSURE

The invention relates to methods of obtaining monocrystals of ruby.

The invention resides in a method of growing monocrystals of ruby by drawings a monocrystal of ruby from a molten charge by means of an initiation piece, comprising the steps of placing the charge into a container vessel, heating this charge for melting same by using the energy of a high-frequency electric field, in which method, in accordance with the invention, the process of growing a monocrystal of ruby is carried out within an oxidizing gas atmosphere inside a positively cooled container, with an amount of aluminum metal being initially placed into the charge, this amount of aluminum metal being subsequently molten and superheated under the action of the high-frequency electric field, in order to effect melting of the charge and to transmit the energy of the said field directly to the molten charge, bypassing the container.

---

The present invention relates to the techniques of growing monocrystals, and, more particularly, it relates to methods of producing monocrystals of ruby.

There is a known method of growing monocrystals of ruby ($Al_2O_3 + Cr^{3+}$) from a molten charge by drawing a monocrystal of ruby from the charge by means of a seed crystal (the Czochralski method), comprising the steps of placing a charge into a container, heating up said charge in order to melt it under the action of a high-frequency electric field, immersing an appropriately oriented seed crystal into the molten charge and drawing a monocrystal therefrom. According to this known method, the monocrystal growing process is carried out in an iridium container, in an inert gas atmosphere.

A disadvantage of this known method of growing monocrystals of ruby is the necessity of using an iridium container, iridium being the only material suitable for the purpose. However, iridium containers are fairly expensive and not adequately durable.

Another disadvantage of the known method is the use of complicated and costly apparatus providing a controllable inert gas atmosphere.

Moreover, with this known method the quality of the grown crystals is liable to be affected by the products of reduction finding their way into the crystal being grown.

It is an object of the present invention to provide a method of growing monocrystals of ruby from a molten charge, which should not necessitate the use of an iridium container.

It is another object of the present invention to create a method of growing monocrystals of ruby from a molten charge, which should not necessitate the use of complicated apparatus for providing a controllable inert gas atmosphere.

These and other objects are attained in the hereinafter disclosed method of growing monocrystals of ruby from a molten charge by drawing a monocrystal of ruby from said charge by means of a seed crystal, comprising the steps of placing a charge into a container vessel, heating said charge in order to melt same by using the energy of a high-frequency electric field, immersing an apropriately oriented seed crystal into said molten charge and drawing a monocrystal therefrom. In accordance with the present invention, the process of growing a monocrystal of ruby is carried out within an oxidizing atmosphere, inside a positively cooled container, with a piece of metallic aluminum being placed into said charge, with subsequent melting of said piece of metallic aluminum and superheating same under the action of said high-frequency electric field, in order to effect melting of said charge and to transmit the energy of said field directly to said molten charge, bypassing said container.

It is advisable for said energy (frequency) of said high-frequency electric field, employed to effect heating of said charge, to be not below 1.0 megacycle per second.

It is further advisable for said energy of said high-frequency electric field, employed to effect heating of said charge, to lie within a 3.0 to 5.0 megacycles per second range.

It is also advisable to carry out the herein disclosed process in ambient air, the latter serving as said oxidizing atmosphere.

As a result of the present invention, there has been created a method of growing monocrystals of ruby from a molten charge, providing for growing monocrystals of ruby without the employment of expensive iridium containers and of complicated apparatus for creating a controllable inert gas atmosphere.

The present invention will be further described in connection with an embodiment thereof, with reference being had to the accompanying set of drawings, wherein.

Figure 1:
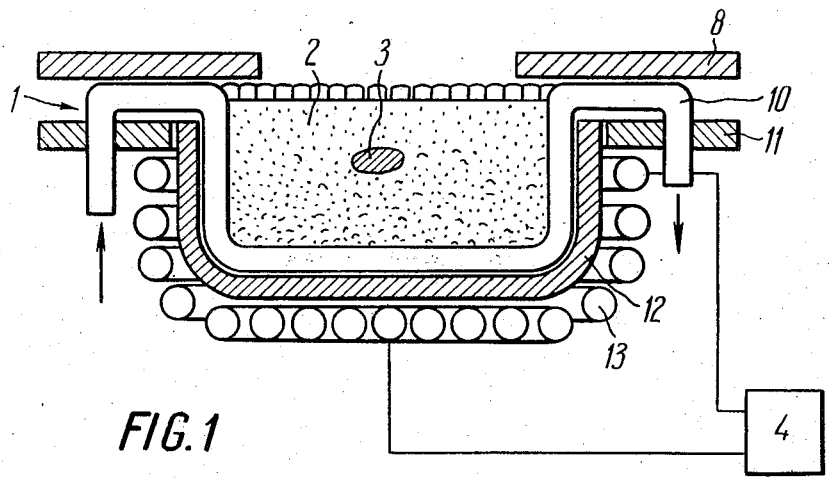
FIG. 1 shows schematically a sectional view of an apparatus for effecting a method of growing monocrystals of ruby from molten charge, according to the present invention, prior to energization of the high-frequency generator.

The herein disclosed method of growing monocrystals of ruby resides in drawing a monocrystal of ruby by means of a seed crystal from a molten charge contained in a positively cooled container. The method can be performed in the following manner.

A container 1 (FIG. 1 of the appended drawings) is filled with a charge 2 consisting of 99.999% pure aluminum oxide and from 0.01 to 10.0 percent by weight of 99.999% pure chromium oxide. The weight content of the chromium oxide in the charge depends on the future applications of the monocrystal to be grown.

From 1.0 gram to 2.0 grams of metallic aluminum 3, 99.999% pure, is positioned centrally of the charge. The metal 3 is heated up by the energy of a high-frequency electric field produced by a generator 4, till the metal temperature is higher than its melting point. The heated up metal is therefore, oxidized, and there is produced a relatively great amount of energy, sufficient for melting the charge 2 receiving thereinside the metal 3.

The molten charge 5 (FIG. 2), which now takes the place of the charge 2, being highly electrically conductive, absorbs directly the energy of the high-frequently electric field. The metal 3 completely oxidizes, and the resulting oxide remains in the molten charge 5. Now a monocrystal 6 of ruby can be drawn from the molten charge 5 by means of a correspondingly oriented seed crystal 7, the latter being rotated about its axis at an angular speed of 30 to 50 r.p.m.

The diameter of the monocrystal 6 can be adjusted with the help of heat screens 8 made of aluminum oxide, as well as by regulating the output of the high-frequency generator 4.

The positively cooled container 1 does not enter into a chemical reaction with the molten charge 5, since a layer of solidified charge 9 is always present intermediate of the internal wall of the container 1 and the molten charge 5, the thickness of this layer being about 1–2 mm.

Figure 2:
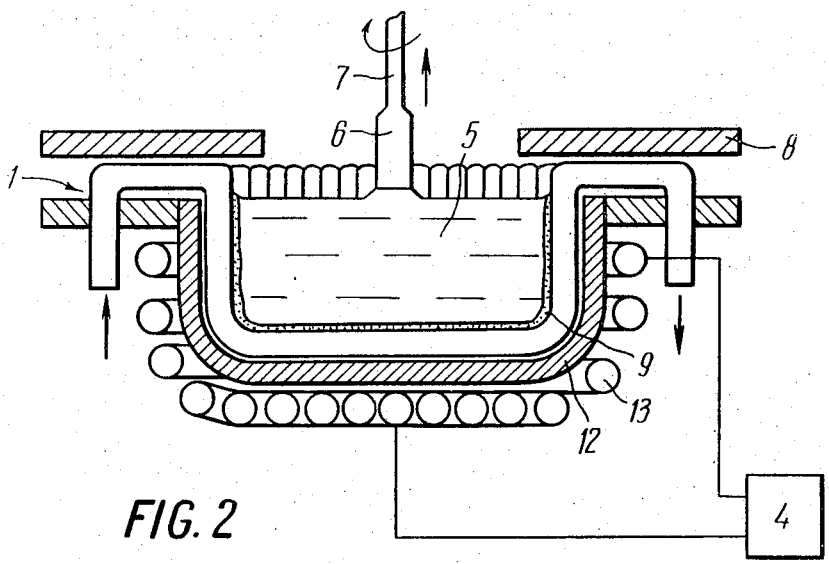
FIG. 2 shows the same apparatus in the course of the crystal drawing operation.
Figure 3:
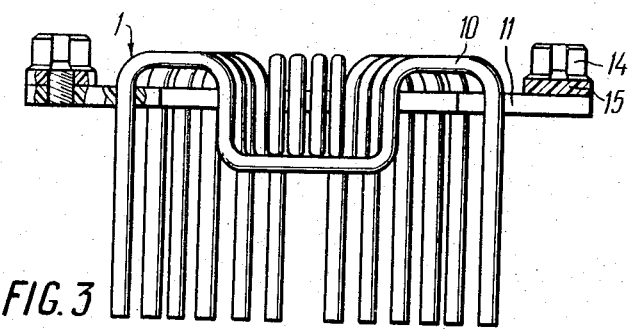
FIG. 3 shows the positively cooled container of the apparatus for effecting the method of growing monocrystals of ruby from a molten charge, according to the present invention (a sectional view taken along line III—III of FIG. 5 of the appended drawings)
Figure 4:
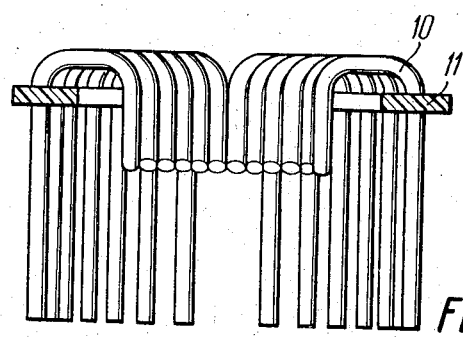
FIG. 4 is the side view of the container shown in FIG. 3 (a sectional view taken along line IV—IV of FIG. 5)
Figure 5:
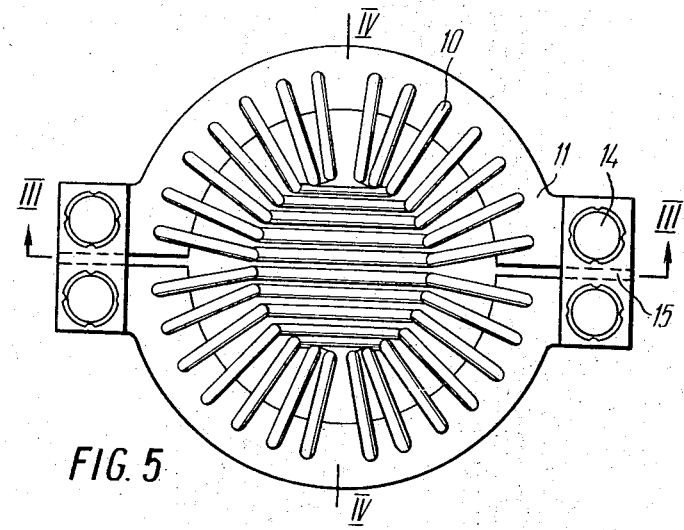
FIG. 5 is the plan view of the container shown in FIG. 3.

The positively cooled container 1 is made up of a pair of sections (FIG. 5) assembled from chromium-plated copper tubes 10 (FIGS. 3, 4 and 5) not electrically connected with one another and physically interconnected by a split retaining ring 11 made of an electrically insulating material, e.g. of micalex. The tubes 10 are received inside a quartz receptacle 12 (FIGS. 1 and 2). The entire container assembly comprising the container 1 and the receptacle 12 is positioned within the inductor 13 of the high-frequency generator 4.

The retaining ring 11 is secured by screws 14 (FIGS. 3 and 5), with gaskets 15 interposed.

The direction of the flow of cooling water through the container is indicated by the arrow line in FIGS. 1 and 2.

It has been found that the process of growing a monocrystal of ruby in accordance with the herein disclosed method can be carried out with the frequency of the high-frequency field not below 1.0 megacycle per second.

EXAMPLE

The herein-disclosed method of growing a monocrystal of ruby has been practically tested in a laboratory.

A 18 kw. high-frequency generator was provided, the output frequency being 3.6 megacycles per sec. The container was 56 mm. in diameter and 40 mm. high. The charge consisted of 99.9999% pure aluminum oxide and 99.99% pure chromium oxide. The weight of the charge was 250 gr. A 1 gr. amount of metallic aluminum was positioned centrally of the charge. The temperature of the molten charge was from 2100° C. to 2250° C. The monocrystal growing rate was maintained within 5 to 20 mm./hour, the rotation speed being 30 to 50 r.p.m.

The abovedescribed conditions made it possible to turn approx. one half of the entire charge into the monocrystal grown on the initiator piece.

The overall length of the monocrystal thus grown was 160 mm., its maximal diameter being up to 16 mm.

What we claim is:

1. A method of growing a monocrystal of ruby from a molten charge by drawing a mono-crystal of ruby from said charge by means of a seed crystal, comprising the steps of: placing a charge into a positively cooled container positioned within an oxidizing gas atmosphere; introducing a piece of metallic aluminum positioned centrally within said charge; providing a high-frequency electric field at a frequency not below 1.0 megacycle per second; heating up said metallic aluminum above the melting point thereof under the action of said high-frequency electric field, in order to effect melting of said charge and to transmit the energy of said high-frequency electric field directly to said molten charge, bypassing said container and wherein a layer of solidified charge is maintained on the inner surface of the positively cooled container due to the cooling effect thereof, thus preventing any chemical reaction between the molten charge and said container; immersing an appropriately oriented seed crystal into said molten charge; and drawing a monocrystal of ruby from said molten charge, by means of said seed crystal.

2. A method according to claim 1, wherein the frequency of said high-frequency electric field, employed to effect heating of said charge, is within 3.0 to 5.0 megacycles per second.

3. A method according to claim 1, wherein said oxidizing gas atmosphere is ambient atmosphere.

References Cited

UNITED STATES PATENTS

| | | | |
|---|---|---|---|
| 2,998,335 | 8/1961 | Dehmelt | 23—301 SP |
| 2,693,406 | 11/1954 | Wendell et al. | 23—142 |
| 2,872,299 | 2/1959 | Celmer et al. | 23—301 SP |
| 3,446,603 | 5/1969 | Loiacono et al. | 23—301 SP |
| 2,362,147 | 11/1944 | Mondolfo | 75—68 R |
| 3,436,212 | 4/1969 | Hess | 75—68 R |
| 3,608,050 | 9/1971 | Carman | 106—42 |
| 3,156,549 | 11/1964 | Kelemen | 106—42 X |
| 1,658,659 | 2/1928 | Skaupy et al. | 106—42 X |
| 2,930,098 | 3/1960 | Emeis | 106—42 X |
| 3,505,025 | 4/1970 | Dessauer | 23—30 SP |
| 3,535,481 | 10/1970 | Korb | 219—10.41 |
| 3,715,194 | 2/1973 | Plooster | 106—42 X |

FOREIGN PATENTS 1,432,731  7/1967  France _____ 106—42

HELEN M. McCARTHY, Primary Examiner

U.S. Cl. X.R.

23—273 SP, 301 SP, 305; 106—42; 219—10.41, 10.67